SYNCHRONOUS IMPEDANCE-TYPE CONVERTER

Filed Oct. 10, 1960

INVENTOR.
RICHARD L. WHITE
BY [signature]
ATTORNEY

3,242,416
SYNCHRONOUS IMPEDANCE-TYPE CONVERTER

Richard L. White, Glendora, Calif., assignor to Hoffman Electronics Corporation, a corporation of California Filed Oct. 10, 1960, Ser. No. 61,501
4 Claims. (Cl. 321—47)

The present invention relates to novel circuits for reducing the effective or root-mean-square (R.M.S.) value of a sine wave voltage, and in particular to circuits which employ solid state devices to accomplish such voltage reduction.

It is often necessary to obtain a voltage from a sine wave source that generates a voltage that has an effective value greater than desired. Present methods for accomplishing this are generally unsatisfactory as they commonly employ bulky devices which dissipate an excessive amount of power. In addition, such devices are often sensitive to variations in the frequency and/or magnitude of the supply voltage and to changes in the load impedance.

Therefore, it is an object of this invention to provide a relatively simple device that is capable of reducing the effective or root-mean-square value of a sine wave voltage while dissipating a minimum amount of power.

It is a further object of this invention to provide circuits for reducing the effective value of a sine wave voltage which are relatively insensitive to variations in the magnitude and/or frequency of such a voltage.

It is a still further object of this invention to provide an R.M.S. voltage transformer in which the load current is determined by the parameters of the load and not by the control circuit.

According to the present invention an electrical load and a solid state electronic translating device, such as a controlled rectifier, that has first and second electrodes and a control electrode are connected in series and coupled to a source of sine wave voltage. Means comprising passive elements only are also coupled between the source and electronic translating device for establishing a control current between the above-mentioned second electrode and the control electrode. The electronic translating device remains non-conductive until a control current of proper amplitude and phase with respect to the applied voltage is present, at which time the voltage drop across it becomes extremely small and the load voltage becomes equal to the source voltage for the remainder of the half cycle. By thus regulating the conduction angle, or portion of a cycle that such a voltage is reproduced across a load, the effective value of the voltage may be reduced to any desired value. Proper design of the control circuit provides a device relatively insensitive to variations in the magnitude or frequency of the supply voltage. As the effective load voltage is predetermined, the load current is a function primarily of the parameters of the load and not of the control circuit.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 2(*a*) is a schematic diagram showing the circuit of a sine wave R.M.S. voltage transformer providing a conduction interval in the first and second quadrant.

FIGURE 2(*b*) is a graphical representation of certain current and voltage wave forms obtained from the circuit of FIGURE 1.

FIGURE 3(*a*) is a schematic diagram showing the circuit of a sine wave R.M.S. voltage transformer providing a conduction interval in the second quadrant only.

FIGURE 3(*b*) is a graphical representation of certain current and voltage wave forms obtained from the circuit of FIGURE 3(*a*).

FIGURE 4(*a*) is a schematic diagram showing the circuit of another embodiment of a sine wave R.M.S. voltage transformer providing a conduction interval in the second quadrant only.

FIGURE 4(*b*) is a graphical representation of certain current and voltage wave forms obtained from the circuit of FIGURE 4(*a*).

Figures 1, 2A, 2B, 3A, 3B, 4A, 4B:
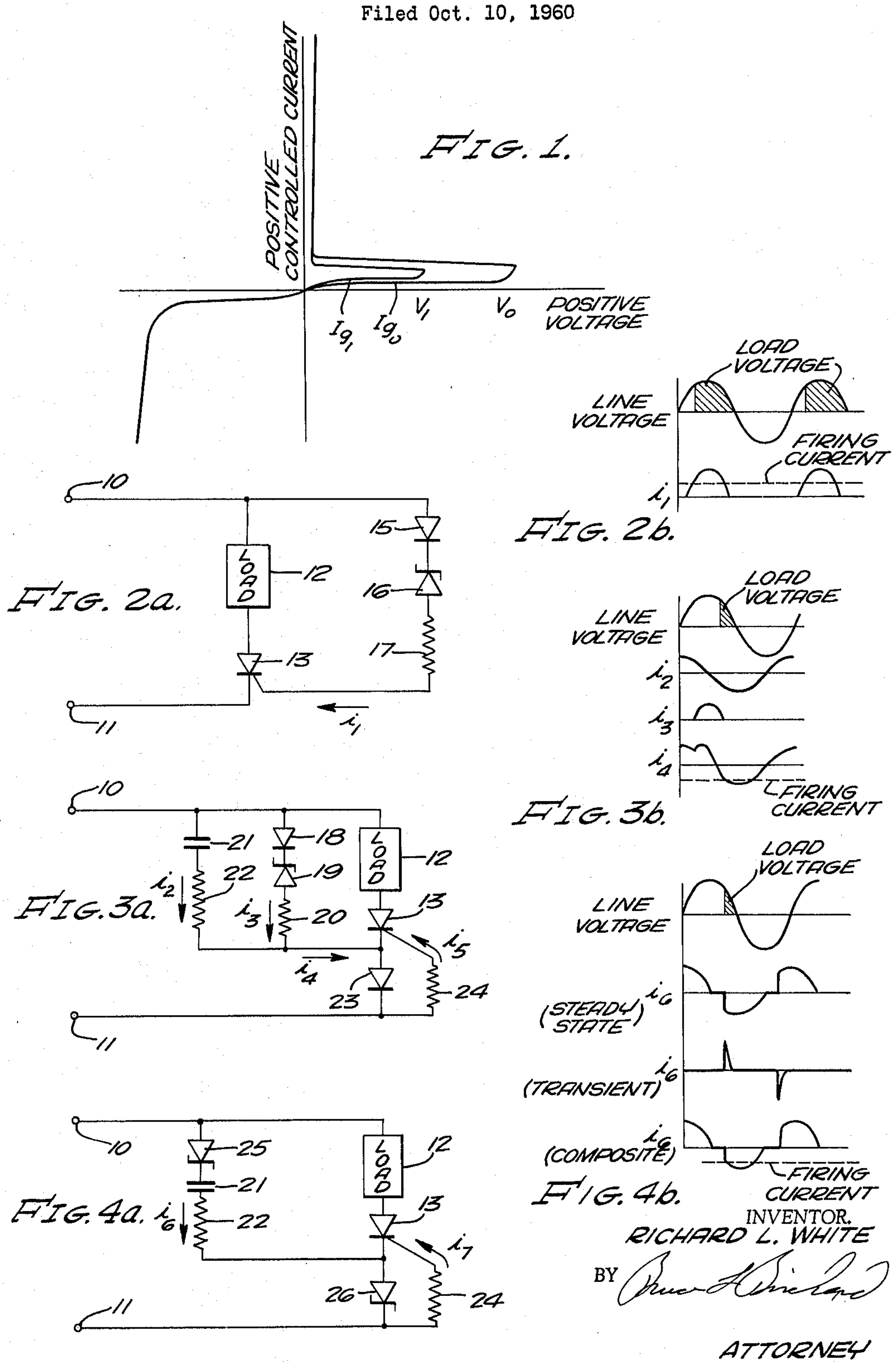
FIGURE 1 is a family of curves showing typical voltage-current characteristics of a controlled rectifier.

The basic element in the disclosed circuits is solid state device 13 which is a controlled rectifier. The power consumption of such a device is extremely low as it does not dissipate power except during conduction at which time the voltage drop across it is extremely small. This is indicated in FIGURE 1 which is a graphical representation of the voltage-current characteristics of a typical controlled rectifier. Not only is it evident therefrom that such a device has a region of high impedance that is followed by a region of extremely low voltage and high conduction, it is also evident that the magnitude of the breakover voltage is a function of the control electrode or gate current. By way of example, breakover voltages $V_1$ and $V_0$ are shown in FIGURE 1 for gate current $I_{g1}$ and zero gate current, $I_{g0}$, respectively. These switching or gate currents are but a fraction of the total current carrying capacity of the device. In addition, after conduction has been initiated in such a device, the control electrode loses control and conduction continues until the forward voltage is reduced to approximately zero volts. In the circuits shown in FIGURES 2(*a*), 3(*a*), and 4(*a*), proper correlation of the gate currents, $i_1$, $i_5$, and $i_7$, respectively, and a sine wave voltage applied to input terminals 10 and 11, allows controlled rectifier 13 to regulate the conduction angle or portion of the cycle that the sine wave voltage is reproduced across load 12. This regulation of the angle of conduction permits the effective voltage applied to the load to be reduced to any desired value.

A well known mathematical expression relates the conduction angle of a sine wave voltage and the effective value of the resulting wave form. Using it to determine the necessary conduction angle for a desired effective voltage, it is then possible to determine from the characteristic curves of the controlled rectifier the gate current necessary to break down, or "fire," the controlled rectifier at the voltage corresponding to the angle at which it is necessary to initiate conduction. FIGURE 2(*a*) shows a controlled rectifier with an associated control circuit for providing an effective voltage requiring a conduction interval between theta and 180 degrees where theta is less than 90 degrees. In that circuit input terminals 10 and 11 are adapted for connection to a source of sine wave voltage and are shunted by series connected load 12 and controlled rectifier 13. Controlled rectifier 13 is of the p-n-p-n junction configuration which requires a forward gate current for switching, i.e., a flow of positive current into the gate is necessary to initiate conduction. The control circuit comprises series connected resistor 17, Zener diode 16, and diode 15. The operation of the circuit in FIGURE 2(*a*), as shown in FIGURE 2(*b*), is as follows: When the sine wave voltage applied to terminals 10 and 11 is positive and equal to the Zener voltage of diode 16, a gate current, $i_1$, is established which is in phase with the applied voltage and has a magnitude that is limited by resistor 17. By selecting the Zener voltage slightly less than the voltage corresponding to the desired firing angle, a "firing" current with an extremely steep wave front will flow in the control circuit. The magnitude of this current can be adjusted by resistor 17 to "fire" the controlled rectifier precisely at the desired voltage or firing angle. The steep wave front is the result of the delay in conduction which thereby produces a need for a faster rise time in order to reach the necessary magnitude of firing current at the desired firing angle. This steep wave front on the "firing" current reduces the sensitivity of the firing angle to parameter variations such as amplitude variations of the applied voltage, variations in gate current characteristics which result from manufacturing tolerances and ambient temperature changes, and the like. It should be noted that since the control current is in phase with the line voltage and hence not frequency sensitive, the firing angle will not vary with changes in the supply frequency. After the gate current has "fired" the controlled rectifier and initiated conduction, the voltage drop across the controlled rectifier becomes very small, as shown in FIGURE 1, and the load voltage becomes equal to the applied voltage for the remainder of the positive half cycle. As it is the load voltage that is controlled, the load current is determined by load parameters which can be varied, therefore, without varying the control circuit. During the negative half cycle no power is dissipated by the circuit as diode 15 and the controlled rectifier 13 are reversed biased. Hence, this control circuit, including the controlled rectifier, dissipates a very small amount of undesired power. It should be observed that although the diodes add highly desirable features to this circuit, they are not essential to the establishment of a firing angle.

The circuit shown in FIGURE 2(*a*) may also be used to provide an effective voltage that requires conduction during a portion of the second quadrant only by substituting an inductor for diode 15. In many instances, however, the size of the inductor required may be too large to be practical, in which case the circuit shown in FIGURE 3(*a*) may be used. That circuit shows input terminals 10 and 11 shunted by a series circuit comprising load 12, controlled rectifier 13, and diode 23. The control electrode is coupled to ground through current limiting resistor 24, and the cathode of controlled rectifier 13 is coupled to input terminal 10 by series connected capacitor 21 and resistor 22 which are in parallel connection with series connected resistor 20, Zener diode 19, and diode 18. Such an arrangement causes a forward gate current, $i_5$, to flow when current $i_4$ is negative. As this happens when the applied voltage is in the second quadrant but not when the applied voltage is in the first quadrant, a conduction interval in the second quadrant only may be obtained.

The operation, as shown in FIGURE 3(*b*), is as follows: Capacitor 21 serves as a current phase shifting element that has a current $i_2$ which leads the applied voltage by 90 degrees and hence becomes negative when the applied voltage enters the second quadrant. Resistor 22 is provided as a current limiting means. Diode 18, Zener diode 19, and resistor 20 form a clipper circuit that provides a current $i_3$. This clipper circuit is identical to the control circuit of FIGURE 2(*a*) and operates in a similar manner. Other details of its function in the present circuit are discussed below. When the sum of these two currents, $i_4$, is positive, current flows through diode 23, and when it is negative there is a flow of forward gate current, $i_5$, through the control electrode of controlled rectifier 13 and through resistor 24 which is a current limiting device. Consequently, when $i_4$ reaches a predetermined negative value, which occurs when the applied voltage is in the second quadrant but not when it is in the first quadrant, the controlled rectifier "fires," the voltage drop across the controlled rectifier becomes very small, and the load voltage becomes equal to the source voltage for the remainder of the positive half cycle. As discussed in reference to the circuit shown in FIGURE 2(*a*), this method of controlling the load voltage provides a device insensitive to changes in the load impedance.

The circuit supplying branch current $i_3$, although not essential to the establishment of the firing angle, does provide several desirable features, the most important of which is compensation for variations in the amplitude of the supply voltage. This results from the Zener diode having a definite breakdown voltage that corresponds to a different "firing" angle for each value of maximum supply voltage. Thus, an increase in supply voltage results in an increase in the conduction interval of the Zener diode. This increases the period during which $i_4$ and the corresponding gate current, $i_5$, remain less than the necessary "firing" current, and hence postpones the angle at which the controlled rectifier fires. As an increase in supply voltage requires an increase in the firing angle, this is a self-compensating mechanism. An opposite reaction provides compensation when the amplitude of the supply voltage is decreased. Another feature provided by the Zener circuit is a very steep gate current wave front which, as with the circuit in FIGURE 2(a), reduces the sensitivity of the circuit to variations in the parameters mentioned in conjunction therewith, and also to the minor effect of variations in supply frequency. Such frequency variations, although they do not effect $i_3$, nor the phase angle of $i_2$, do effect the magnitude of $i_2$ which effect on the overall conduction characteristic is minimized by a steep firing current wave front, as mentioned above. Diode 18 is provided as a means of preventing current flow in the branch during the negative half cycle and may be omitted if desired.

Purely by way of example, the components of the circuit shown in FIGURE 3(*a*) may have the following designations and/or values:

| | |
|---|---|
| Controlled rectifier 13 | HCR–200P. |
| Diode 23 | Type 1N1254. |
| Diode 18 | Type 1N1254. |
| Zener diode 19 | Type 1N1797. |
| Capacitor 21 | .05 mfds. |
| Resistor 20 | 4700 ohms. |
| Resistor 22 | 5000 ohms. |
| Resistor 24 | 470 ohms. |

A circuit comprising the foregoing components has been tested successfully using a 120 R.M.S. voltage source (±10%) to provide 28 volts (R.M.S.) to an 82 ohm load.

Should the input voltage be applied to the circuit shown in FIGURE 3(*a*) during a negative half cycle, a large negative transient current pulse could be established that would continue to flow after the applied voltage has reversed its polarity. When the gate current consists of a large pulse of comparaively short duration, an additional factor determines whether such a pulse will be sufficient to break down the controlled rectifier. That factor is the total charge, Q, involved and depends upon both the width and the amplitude of the pulse. Should the aforementioned negative transient pulse supply sufficient charge at the beginning of the positive half cycle to initiate conduction at that time, a significantly larger effective voltage could be applied to the load than it was designed to withstand. In instances where the load is unable to tolerate an excessive voltage for only one cycle, one Zener diode can be inserted in series with capacitor 21 and another substituted for diode 23. These will prevent undesired transients and line surge voltages from firing the controlled rectifier. Their addition also results in a gate current that has a steady-state term and a transient term that is repetitive, every half cycle and greatly increases the slope of the gate current wave front. A more precise control of the firing angle is also obtained. When the clipper circuit supplying current $i_3$ is omitted, as it can be when compensation for changes in the amplitude of the supply voltage is not necessary, the operation of this circuit, as shown in FIGURE 4, is as follows: During the period when the applied voltage is in the first quadrant, capacitor 21 charges to the peak applied voltage. However, in the second quadrant Zener diode 25 is reversed biased and there is no current flow until the difference between the peak applied voltage now on capacitor 21 and the voltage present at terminal 10 is equal to the Zener voltage of diode 25. This is designed to occur at the desired firing angle at which time there is a sharp surge of negative current, $i_4$, and a corresponding forward gate current, $i_5$, of sufficient magnitude to "fire" the controlled rectifier. The presence of Zener diode 25 also limits the aforementioned applied negative voltages capable of establishing initial undesired transient currents to those in excess of its Zener voltage. Therefore, these voltages necessarily must occur in a conduction interval substantially in advance of the point at which the applied voltage goes positive. Diode 26 is designed to clip these voltages at a value slightly in excess of that necessary to establish the necessary "steady state" firing current. In this way diodes 25 and 26 combine to limit the interval of occurrence and magnitude, respectively, of possible undesired transient currents in such a manner as to prevent them from causing undesired "firing" of the controlled rectifier at a time when excessively large effective voltages would result. Additional transient protection can be obtained by coupling the cathode and control electrode of the controlled rectifier with a judiciously selected capacitor.

Employing the following component designations and/or values, the circuit shown in FIGURE 4(*a*) has been tested successfully using a 120 R.M.S. voltage source (±10%) to provide 28 bolts (R.M.S.) to an 82 ohm load.

| | |
|---|---|
| Controlled rectifier **13** | HCR–200P. |
| Zener diode **25** | 1N1789. |
| Zener diode **26** | 1N1769. |
| Capacitor **21** | .12 mfds. |
| Resistor **22** | 1000 ohms. |
| Resistor **24** | 1000 ohms. |

Control of the firing angle in the third quadrant may be obtained by inverting the circuit shown in FIGURE 2(*a*). Conduction control in the fourth quadrant may be obtained by inverting the circuits shown in FIGURES 3(*a*) and 4(*a*).

It should be noted that complementary controlled rectifiers which require a negative gate current (i.e., a flow of positive current out of the gate) may be substituted for the controlled rectifiers which require positive gate current in the aforementioned circuits. Thus, if such a substitution were made in the circuit shown in FIGURE 2(*a*), and if the polarity of all diodes were reversed in that circuit, control of the firing angle in the third quadrant would result. The same substitution and reversal of diode polarity in the inverted circuit of FIGURE 2(*a*) would result in control of the firing angle in the first quadrant. Similar substitutions and reversals of polarity of all diodes in the circuits of FIGURES 3(*a*) and 4(*a*) would provide conduction control in the fourth quadrant, and if made in the inversions of these circuits would provide second quadrant control.

In instances where the impedance of the load is small in comparison to the impedance of the control elements, those elements of the control circuit which are connected to input terminal 10 may instead be connected to the same load terminal as is the controlled rectifier. This has the packaging advantage of a two terminal series regulating element.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A solid state voltage step-down transformer, comprising first and second input terminals for connection to a sine-wave voltage source, an electrical load, first and second output terminals connected to said load, a controlled solid-state rectifier having first, second and control electrodes, the first and second electrodes of said controlled rectifier being connected between said second output terminal and said second input terminal, said first input terminal being connected to said first output terminal, and voltage-sensitive means coupled between said last-named terminals and said control electrode for establishing a control current between said control electrode and said second electrode of said controlled rectifier, whereby said rectifier is cause to conduct for a preselected portion only of the input cycle.

2. The apparatus as set forth in claim 1 in which the means for establishing a control current comprises a resistor connected to said control electrode.

3. Apparatus according to claim 1 in which said means comprises a clipper circuit.

4. Apparatus according to claim 3 in which said clipper circuit comprises a series connected resistor, Zener diode, and diode.

References Cited by the Examiner

UNITED STATES PATENTS

| | | | |
|---|---|---|---|
| 2,866,106 | 12/1958 | Schuh | 307—88.5 |
| 2,925,546 | 2/1960 | Berman | 321—25 |
| 2,939,064 | 5/1960 | Momberg et al. | 323—22 |
| 2,953,738 | 9/1960 | Bright | 321—47 |

OTHER REFERENCES

Notes on the Application of the Silicon Controlled Rectifier, General Electric Semiconductor Products Department, December 1958; page 50.

General Electric Controlled Rectifier Manual; Published by Semiconductor Products Department of General Electric; copyright March 21, 1960, pages 179–183.

LLOYD McCOLLUM, *Primary Examiner.*

SAMUEL BERNSTEIN, *Examiner.*